United States Patent [19]
Benzing

[11] 3,881,720
[45] May 6, 1975

[54] GRIPLESS SHEET GUIDING APPARATUS

[75] Inventor: James A. Benzing, Hamilton, Ohio

[73] Assignee: Champion International Corporation, Hamilton, Ohio

[22] Filed: Feb. 14, 1974

[21] Appl. No.: 442,322

Related U.S. Application Data

[63] Continuation of Ser. No. 343,309, March 21, 1973, abandoned.

[52] U.S. Cl. .................... 271/63; 83/310; 83/373; 83/450
[51] Int. Cl. .................... B65h 7/00; B23d 25/16
[58] Field of Search .......... 271/42, 63, 84, 85, 198, 271/199, 200, 201, 202, 203, 220, 221, 267, 268, 275; 83/310, 349, 373, 447, 450

[56] References Cited
UNITED STATES PATENTS

| | | | |
|---|---|---|---|
| 1,462,250 | 7/1923 | Slattery et al. | 271/84 |
| 1,928,223 | 9/1933 | Harding | 271/42 |
| 2,062,643 | 12/1936 | Edmunds | 271/42 |
| 3,565,423 | 2/1971 | Kluth | 271/199 |

*Primary Examiner*—Evon C. Blunk
*Assistant Examiner*—Robert Saifer
*Attorney, Agent, or Firm*—Gardiner, Sixbey, Bradford and Carlson

[57] ABSTRACT

A gripless sheet feeding apparatus and method directs cut sheets from a cutter to the nip of a turning couple. The feeder has a movable guide that shuttles back and forth in such a way as to avoid striking the protruding cutter blade. The shuttling movement is periodic and preferably is directly driven by the cutter. The sheet feeder is further characterized by using plain, flat gripless guides at least one of which moves in shuttle fashion as aforesaid. The sheet that is cut travels in the space between the guides from the cutter to the out feed or delivery device.

10 Claims, 5 Drawing Figures

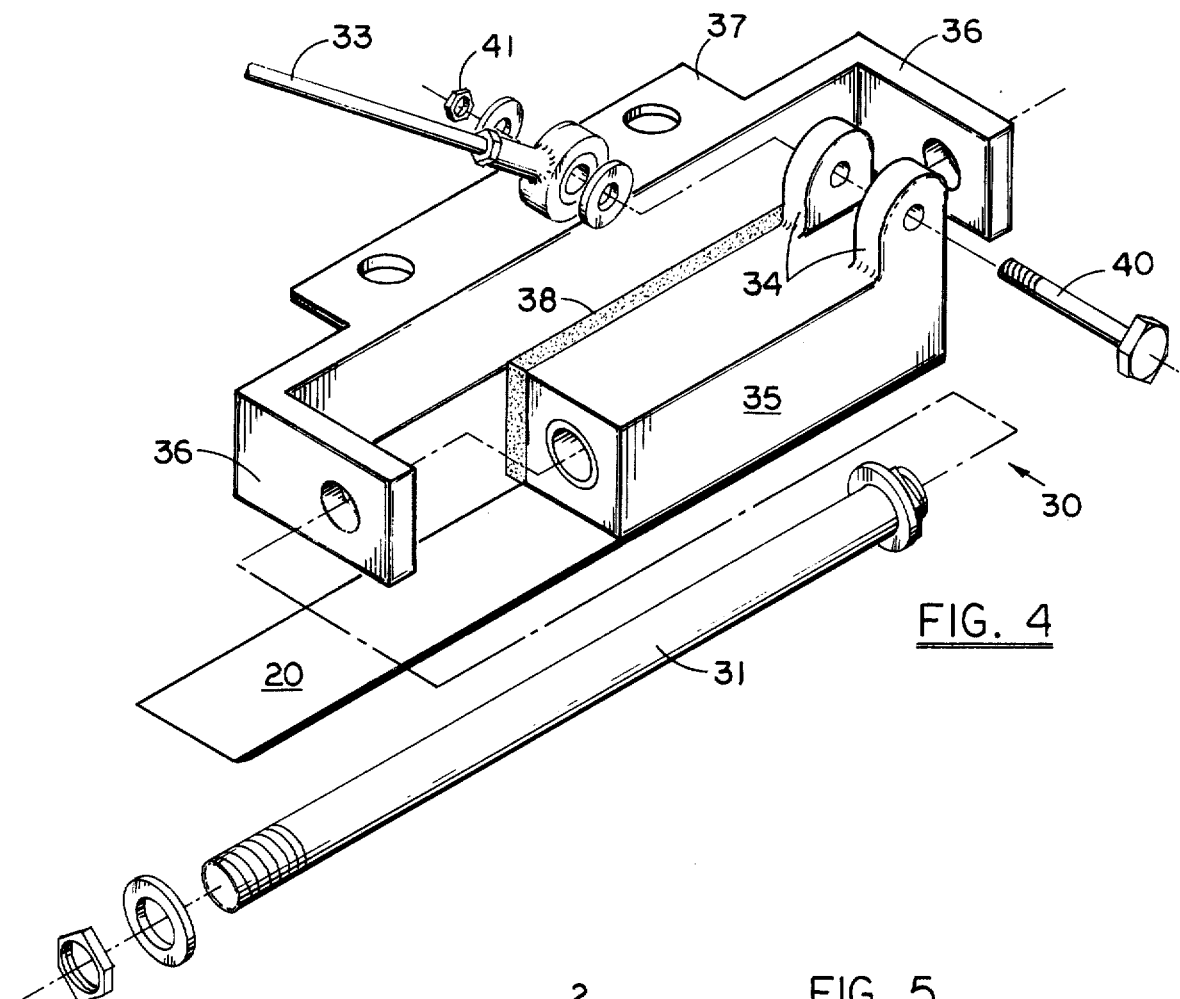
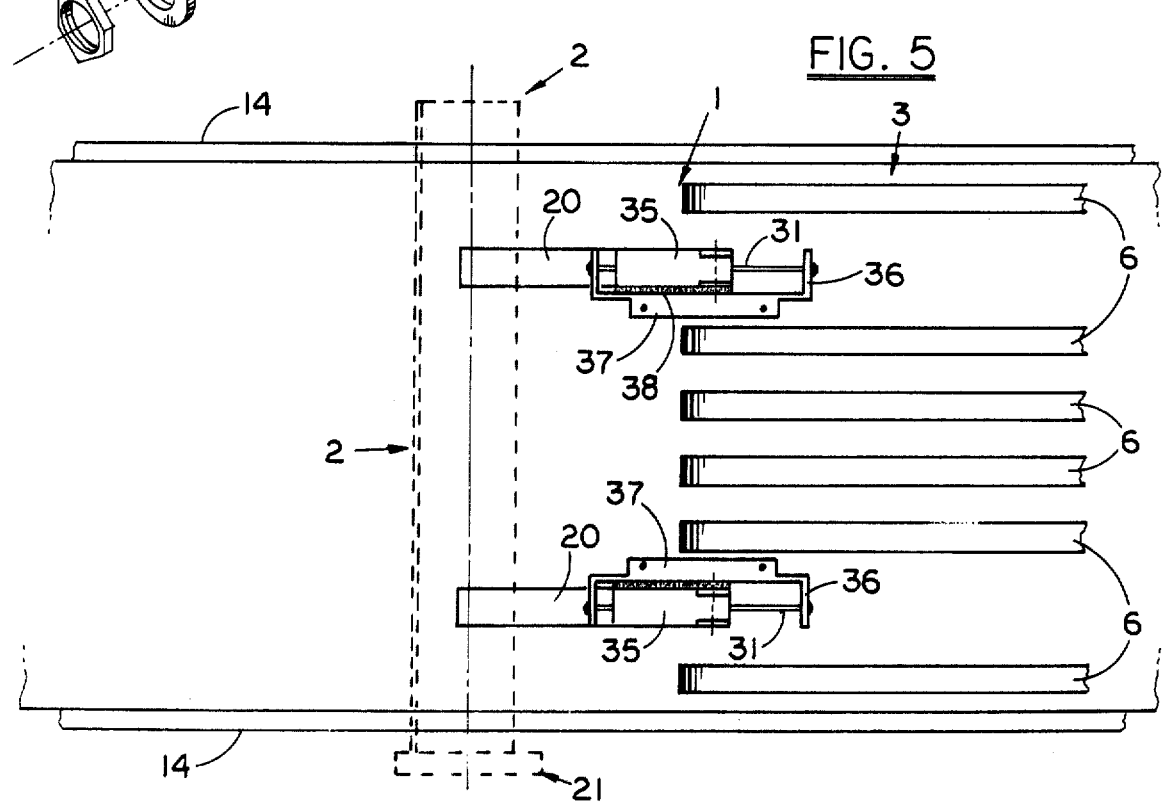

3,881,720

GRIPLESS SHEET GUIDING APPARATUS

This is a continuation of application Ser. No. 343,309, filed 3/21/73, now abandoned.

BACKGROUND AND SUMMARY

This invention relates to an improvement in sheet feeding apparatus and method. One aspect of the invention relates to a gripless sheet feeder apparatus and method. An aspect of the invention relates to a sheet feeder particularly suitable for closely controlling the movement of cut sheets from a cutter to the nip of rollers or conveyor belts which latter are part of a ream wrapping or other converting operation, in connection with which the invention will be described by way of example.

The prior art of wrapping reams conventionally teaches to unwind a web from a reel, feed it to a cutter where it is severed into a succession of individual sheets, transferring the sheets one by one to a suitable outfeed device such as a machine for wrapping such sheets about a succession of reams of cut paper or other objects. The outfeed device normally has an entrance section consisting of a turning couple comprising a pair of opposed rolls or conveyor belts.

Experience has shown that when the cutters are spaced from the turning couple that malfunctions occur when distortions warp, or curl are present in the paper. For example, the extreme amount of bending at small diameter of the web of paper in the reel produces a curl or warp in the paper which causes it to feed improperly into the nip of the turning couple and causing the machine to jam.

The present invention has for an object overcoming the malfunctions due to jamming by providing a suitable device for feeding the cut sheet from the cutter to the nip of the turning couple. A gripless shuttle sheet feeder and method are provided. The cycle of operation is to move the gripless sheet feeder in timed relation to the cutter and in a shuttle-like fashion (periodically and reciprocally) up close to the cutter until the cutter blade (which protrudes) approaches closely, then retracting the movable shuttle for a distance to permit the cutter blade to pass, again extending the gripless sheet guide up close to the cutter and repeating the cycle.

An object of this invention is the provision of an improved gripless sheet feeding apparatus and method. Another object is providing an improved means to control cut sheets over a short distance.

An advantage of the present invention is ease of installation in existing equipment. Further advantage is the reduction of malfunctions, hence machine downtime.

One feature of the invention is a sheet feeder having no positive grips but yet which provides a travel path from the cutting device to an outfeed device such as the nip of a pair of turning members. Another feature is the use of a cutter driven cam and follower in the preferred embodiment.

Other objects, advantages and features will become apparent from a reading of the following description and the drawings wherein:

FIG. 4 is an isometric and exploded view of the shuttle or carriage of FIGS. 1–3; and FIG. 5 is a top view of the assembled right and left hand portions of apparatus constructed according to FIGS. 1–4.

Figure 1:
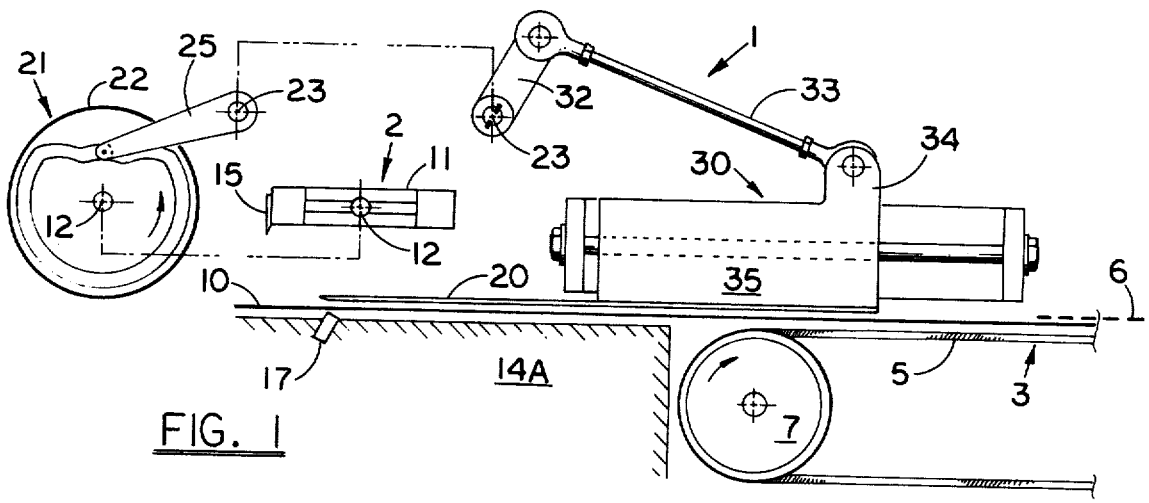
FIGS. 1 and 2 are schematic side views, partially exploded for clarity, of apparatus according to the invention in two different positions: noncutting with shuttle forward (FIG. 1) and cutting with shuttle retracted (FIG. 2)

FIGS. 1–5 schematically illustrate a gripless sheet feeder 1 located between an infeed device shown as a cutter assembly 2 and an outfeed device 3 which can be the entrance section of a wrapping machine. The outfeed device is preferably a turning couple into the nip of which cut sheets are to be fed. The turning couple as illustrated are a pair of opposed conveyor belts 5, 6 mounted as usual on pulley 7, 8 but could with equal facility comprise a pair of conveyor rolls.

The infeed device more particularly includes a reel (not shown) from which a web of paper 10 is unwound by conventional means (known in the industry as an unwinder) and fed to the cutter assembly 2. The cutter assembly includes a rotating member 11 mounted on a shaft 12 between side frames 14. A blade 15 extends outwardly from member 11 and shears the web 10 as the web passes between the movable blade 15 and the fixed blade 17 in the table 14A or between frames 14 of the cutter. The cut sheets 10A (FIG. 2) are then passed into the space between the table and the gripless sheet feeder 1 thence into the nip of the turning couple 5, 6.

The feed of the web to the rotating cutter is accomplished by any purely conventional cutter feeding means, roll couple, conveyor belt or whatever and which forms no part of the present invention which deals with control of and movement of the leading edge of the sheet on the ouput side of the rotating cutter. it is understood, of course, that the cutter itself causes a propelling vector tending to direct the sheet toward the nip of the turning couple 5, 6.

Figure 2:
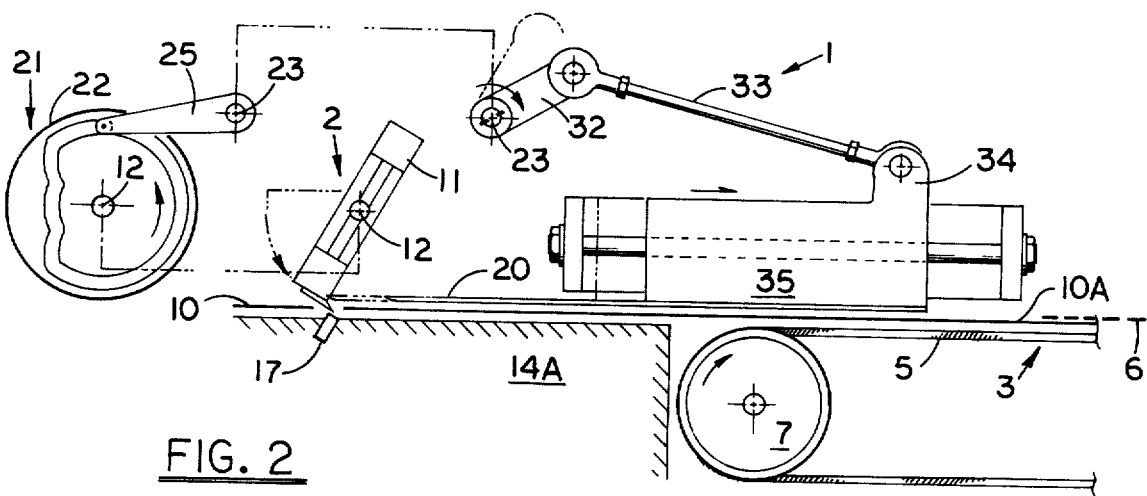
Figure 3:
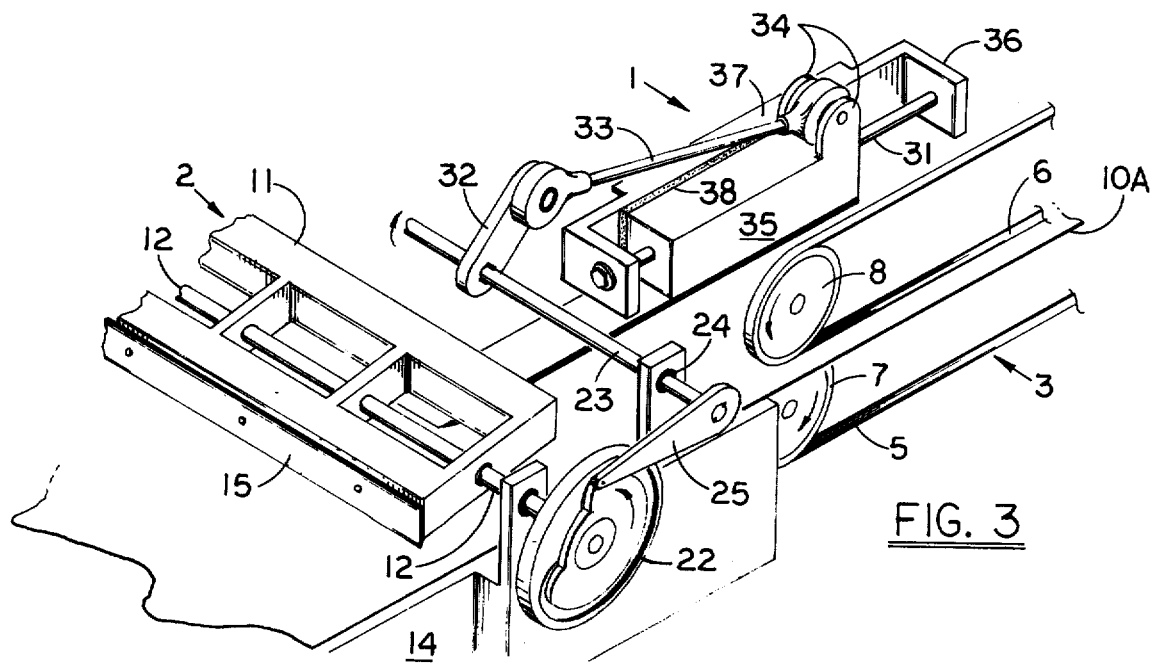
FIG. 3 is an isometric view of the right hand portion (as viewed from the cutter toward the shuttle) of the apparatus of FIGS. 1 and 2.

The gripless sheet feeder 1 shuttles back and forth in such a way as to remain closely adjacent to the cutter elements 15, 17 except during the time that the cutter blade 15 might strike the sheet feeder which is during cutting as in FIG. 2. At such times of striking, mechanical interference would occur, the sheet feeder is removed from the position of interference for a time sufficient for the cutter blade to pass and then the sheet feeder is restored to its extended position adjacent the body of the cutter. Thus, sheets 10A are expelled from the rotating cutter between a pair of closely spaced substantially parallel guides comprising the table 14A and the flat reciprocatable sheet guide 20 (or plurality thereof), which pair of guides provides a path leading from the cutter to the nip of the turning couple 5, 6 and then moving the sheet guide as aforesaid in a periodic reciprocating fashion to avoid mechanical interference, thus causing the leading edge of the cut sheet 10A to be delivered to the nip.

In the preferred embodiment, the table 14A is fixed and horizontal and extends between the infeed and outfeed devices, i.e. between the cutter and the entrance to the nip. The reciprocatable sheet guide is (See FIGS. 3, 5) mounted on a crosshead-like carriage which together with a cam and follower assembly 21 mounted on the cutter bar shaft 12 comprises a means to support and reciprocable move the sheet guide in its parallel path above the table in the timed relationship mentioned above which eliminates the mechanical interference that would otherwise occur between the cutter blades and the sheet guide.

The cam 22 for achieving the periodic motion of the sheet guide is preferably mounted on the cutter bar shaft 12 whereby a positive timed relationship is maintained not only between the cutter and the cam but actually between the cutter and the movable sheet guide. The sheet guide 20 is preferably aligned in the same plane with the bottom of the upper conveyor belt 6 (FIGS. 1, 2) which is the substantially desired entrance point of the nip.

The cam 22 preferably comprises a wheel with a groove cut in one face to provide the cam surface. A cam follower is in the groove and mounted on the arm 25. A cam arm or rocker arm shaft 23 is supported between the machine side frames 14 in a plurality of bearings 24 (at least one at each end). A cam follower arm 25 supported in cantilever fashion from one end of the shaft connects same to the cam groove cut in the cam. The cam follower arm 25 is, of course, keyed or otherwise secured on the rocker shaft 23 so there is no relative motion between the two.

In the preferred embodiment a plurality of reciprocating sheet guides 20 are provided, see FIG. 5. For convenience, only one will be described, it being understood that, as shown in FIG. 4, a plurality are preferred.

Anyway, the sheet guide is mounted on a bottom side of a carriage assembly 30 (FIG. 4) which is in turn mounted on a carriage control rod 31 in a manner similar to a sort of cross-head mounting. The crank arm 32 is secured on the rocker shaft 23 as by a key, set screw or other means and connected by a connecting rod 33 to the lugs 34 on the top of the carriage body 35. Thus, the cam 22 transmits motion through its follower assembly and a modified slider crank mechanism 30, 32, 33 to achieve reciprocating motion of the carrier and the sheet guide. The arm 32 rocks arcuately as does shaft 23: it does not rotate nor does the shaft 23.

The carriage as already noted is mounted on the carriage rod 31 which is in turn secured by nuts between a pair of rod support lugs 36 that define the maximum permissible fore and aft motion of the carriage as well as supporting the rod. The lugs 36 are in turn mounted on or a part of carriage support brackets 37 which are secured to the side frame 14 or table 14A of the machine or some other suitable support. A sheet of low friction material 38 such as nylon or teflon (polyamide or polytetrafluoroethylene respectively) provides a low friction surface between the carriage and the support bracket so that any revolving of the carriage on the rod is substantially controlled or eliminated by engagement between the low friction surface and the bracket 37.

As shown in FIG. 4 a suitable bolt and nut 40, 41 are provided at both ends of the connecting rod to pivotally connect to the adjacent links.

In the preferred embodiment the cam retracts the sheet guide, holds it out of the way, and then returns it to the extended position adjacent the cutter over a cutter rotation angle of 112°. Thus, the major portion of the cutting and rotation cycle is spent with the sheet guide in the retracted position and a minor portion of such cycle is spent with the same in an extended position as closely adjacent the cutter body as possible.

We therefore provide a non-gripping sheet feeding means for receiving a sheet from an infeed device and guiding it to an outfeed device and which comprises a fixed horizontal table member extending substantially between said infeed and outfeed devices for serving as a bottom guide or sheet support, a reciprocatable sheet guide, and means for supporting and reciprocably moving said sheet guide in a path substantially parallel to and above said table member and to and from between said infeed and outfeed devices in timed relationship to one of said devices, said sheet being fed from said infeed device between said table member and said sheet guide, thence to said outfeed device.

The invention claimed is:

1. A non-gripping sheet feeding means for receiving a sheet from an infeed device such as a cutter or the like having sheet feeding means and guiding it to an outfeed device such as a layboy or the like having an infeed conveying means, and which comprises:

a fixed horizontal table member extending substantially between said infeed and outfeed devices for serving as a bottom guide or sheet support;

a reciprocatable non-gripping sheet guide; and means for supporting and reciprocably moving said sheet guide in a path substantially parallel to and above said table member and to and from between said infeed and outfeed devices in timed relationship to at least one of said devices;

said sheet being fed from said infeed device between said table member and said sheet guide, thence to said outfeed device.

2. A non-gripping sheet feeding means as defined in claim 1 wherein said sheet guide is comprised of a reciprocating shuttle having a projecting finger extending toward said infeed device and said supporting and reciprocally moving means includes a cross head control rod supporting said shuttle for said horizontal reciprocating movement;

a connecting rod having one end connected to said shuttle;

a cam and follower means;

means connecting the opposite end of said connecting rod to said follower means whereby movement of said follower means under the influence of said cam is translated into reciprocation of said shuttle.

3. Apparatus according to claim 2 wherein said infeed device has an element that periodically is moved to a position where it would mechanically interfere with said sheet guide at the latter's extended position and wherein said means for supporting and moving periodically retracts said sheet guide from its extended position at times to avoid such interference and returns said guide after said element is moved away from such interfering position.

4. A non-gripping sheet feeding means as defined in claim 2 wherein said infeed device is a cutter and said element is a knife.

5. Apparatus according to claim 1 further comprising a plurality of said sheet guides disposed across said horizontal table member and of said means for supporting and moving each of said sheet guides.

6. A non-gripping sheet feeding means for directing a sheet from an infeed device to an outfeed device including the combination of a driven infeed device;

an outfeed device for moving the sheet away from the infeed device;

a horizontal surface between said infeed and outfeed devices and extending under the infeed device;

a linearly reciprocating non-gripping guide;

means movable parallel to and over said surface toward and away from the infeed device;

means for supporting and moving said reciprocating guide means, said means moving said guide means toward and away from the infeed device in timed relation with respect thereto; said sheet being thus directed from said infeed to said outfeed device so as to prevent its uplifting from the horizontal surface during movement.

7. A non-gripping sheet feeding means as defined in claim 6 wherein said sheet guide is comprised of reciprocating shuttle having a projecting finger extending toward said infeed device and said supporting and moving means includes a cross-head control rod supporting said shuttle for said horizontal reciprocating movement;

a connecting rod having one end connected to said shuttle;

a cam and follower means;

means connecting the opposite end of said connecting rod to said follower means whereby movement of said follower means under the influence of said cam is translated into reciprocation of said shuttle.

8. A non-gripping sheet feeding device as defined in claim 7 wherein said infeed device includes means movable periodically into interfering relation with the most proximate position of said sheet guide relative to said infeed means and wherein said cam means is driven from said infeed means to withdraw said sheet guide from its most proximate position when said movable means moves into interfering position.

9. A non-gripping sheet feeding device as defined in claim 8 wherein said infeed device is cutter and said periodically movable means is a cutter blade.

10. A sheet feed device as defined in claim 6 including a plurality of said sheet guides disposed across said horizontal surface and of said means for supporting and said means for moving each of said sheet guides moves all of said guides in concert.

* * * * *